Dec. 10, 1940.  C. LOSE, JR  2,224,191
FILTER BED CLEANING
Filed April 18, 1939  2 Sheets-Sheet 1

INVENTOR
CHARLES LOSE, JR.
BY Louis L. Ansart
his ATTORNEY

Dec. 10, 1940.  C. LOSE, JR  2,224,191
FILTER BED CLEANING
Filed April 18, 1939  2 Sheets-Sheet 2

INVENTOR
CHARLES LOSE, JR.
BY Louis L. Ansart
his ATTORNEY

Patented Dec. 10, 1940

2,224,191

UNITED STATES PATENT OFFICE 2,224,191

FILTER BED CLEANING

Charles Lose, Jr., Cranford, N. J.

Application April 18, 1939, Serial No. 268,455

17 Claims. (Cl. 210—128)

The present invention relates to combined settling and filtration and more particularly to filter bed cleaning in connection with such combined settling and filtration.

Although the invention may be applied to different forms of apparatus including some in which the filter bed channel or tank is remote from any settling tank, it is particularly applicable to the type of combined settling and filtering apparatus which comprises a settling tank and and an endless filter bed channel extending around the tank at the periphery thereof and divided by a filter bed of granular material, such as sand, into an upper part receiving supernatant liquid from the settling tank and a lower part receiving filtered liquid from the filter and discharging filtered liquid therefrom to the outside of the settling tank. In some instances the filter channel is at the inside of the peripheral wall of the settling tank and in other instances at the outside of said peripheral wall.

The filter bed must be cleaned and in order to avoid any necessity for closing down the apparatus for filter bed cleaning, the filter bed may be cleaned to the required extent by a traveling cleaner movable thereover. Said traveling cleaner may comprise a caisson engaging the top of the filter bed, and means projecting downwardly from the caisson to agitate the sand or other filtering medium and assist in the separation of the waste solids from the granular material. The dirty water containing the waste solids separated from the granular filter bed material collects in the caisson and may be withdrawn therefrom by suitable means such as a pump. In some instances the dirty water withdrawn from the caisson is discharged into the settling tank so that, to as great an extent as may be possible, all of the solids may be collected in the settled sludge at the bottom of the settling tank and removed with the sludge.

In prior installations of the general character described, there has been a tendency to pass some of the waste material downwardly through the supporting screen for the filter bed at the locations where the cleaning of the filter bed was taking place. This downward passage of waste material was due to various causes, such for example as the failure to properly clean the granular material of the filter bed and the passage of an abnormal proportion of liquid through a limited area of the filter bed which may be due to abnormal thinness of the filter bed at that point or to the greater cleanness of a limited area which would cause the sewage to pass therethrough more readily than through clogged portions of the filter bed. Such a condition of cleanness might exist just to the rear of the cleaner and the sewage might pass so rapidly as to cause solids to pass downwardly through the bed and into the filtered liquid.

An important object of the invention is to provide novel and advantageous apparatus of the general character described. A further object is to provide apparatus whereby various disadvantages of prior apparatus will be avoided.

According to an approved embodiment of the invention, it is applied to combined settling and filtering apparatus in which there is a central settling tank and an endless filter chamber at the periphery of the settling tank separated by a filter bed of granular material, such as sand, into an upper part receiving supernatant liquid from the settling tank, and a lower part receiving liquid filtered through the filter bed. The filter bed may be kept sufficiently clean by means of a traveling cleaner of any suitable type.

In order to overcome the tendency of the flow of filtered fluid to draw the waste solids downwardly through the part of the screen beneath the traveling cleaner, the lower part of the filter channel, instead of being in one large chamber with an outlet at one side of the apparatus, is divided into a plurality of chambers in each of which the flow of filtered effluent is shut off while the cleaner passes thereover. For this general purpose the lower part of the filter channel may be divided into two chambers separated at one side of the apparatus by a wall or partition and discharging at the opposite side of the apparatus through outlets located side by side at opposite sides of a second partition and having weirs over which the liquid is discharged.

Above each weir there may be provided a vertically slidable gate by means of which the discharge from the chamber beneath a filter section being cleaned may be shut off. Said gates may be operated by automatic means so that each gate will be closed before the cleaner is passed over the corresponding part of the filter bed and is opened after the cleaning of such part is completed. The automatic operating means may be so arranged that the cleaner is normally at rest at the starting end of a half of the filter bed to be cleaned and that the rise of liquid level in the tank to a predetermined level would close the corresponding gate and cause a rise of liquid level in the open part of the effluent channel and a decrease in difference of head at the filter bed. This change in head would in turn cause the cleaner to operate and travel over the filter bed. Then when the cleaning of the first half of the filter was completed the first gate would be opened and the cleaner be thrown out of operation but would move over the starting end of the second half. Then the second gate would close and would cause an increase in head of the effluent and operation of the cleaner over the second half of the filter bed. Ordinarily one trip of the cleaner around the filter bed will cause the liquid level to drop sufficiently to cause the cleaner to stop at the completion of one complete trip around the tank. However, if there has not been a sufficient fall in such liquid level the cleaner will make another trip.

Other objects, features and advantages will appear upon consideration of the following description and of the drawings, in which.

Figure 1:
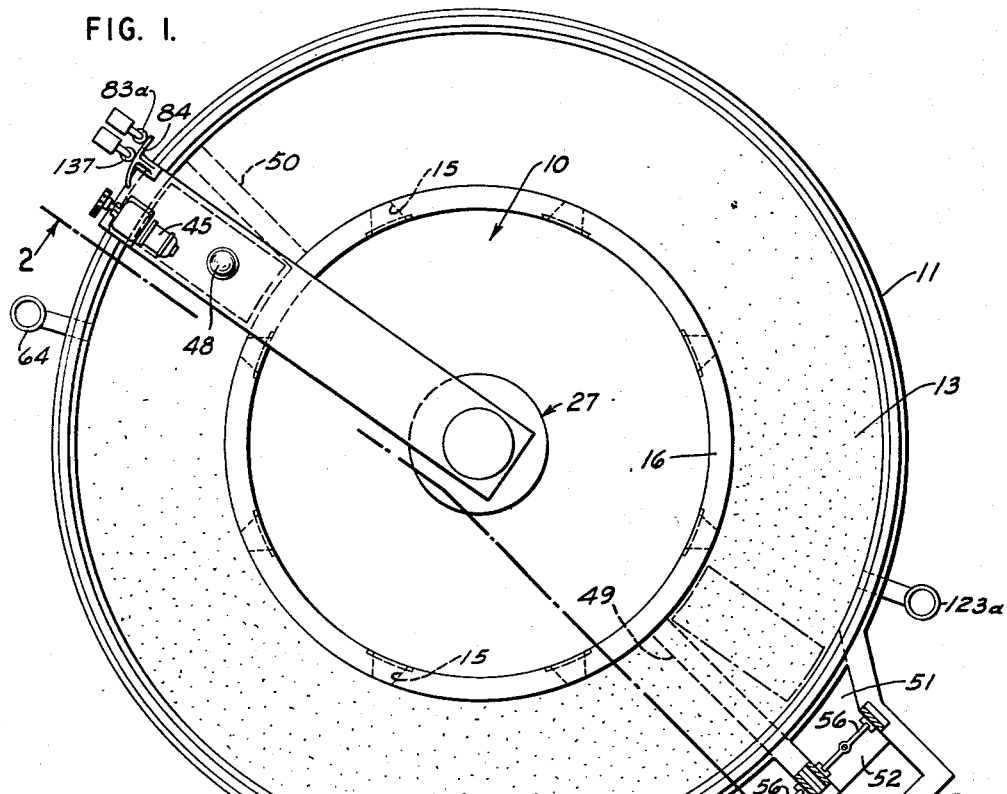
Fig. 1 is a top plan view of apparatus embodying one form of the present invention.
Figure 2:
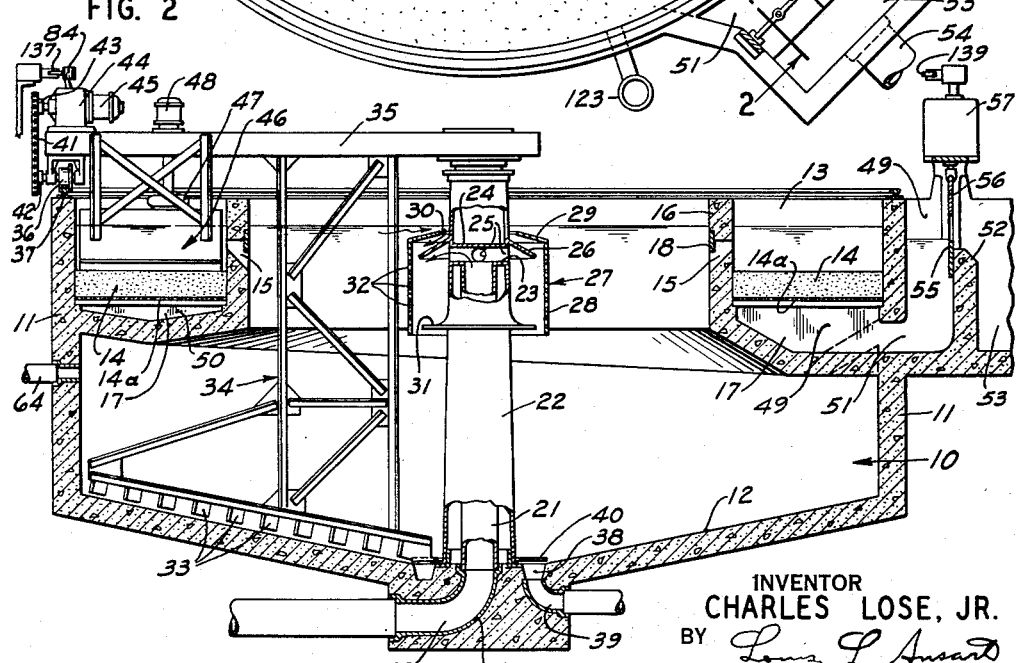
Fig. 2 is a section on the line 2—2 of Fig. 1.

Referring to the drawings, there is disclosed a settling tank 10, preferably round although it may have many other forms including a rectangular one, said tank having a peripheral wall 11 and a bottom 12 sloping downwardly towards its center. At its top the tank 10 is provided with a surrounding filter channel 13 provided with a filter bed 14 suitably supported as by means including a screen 14a, and comprising granular material, such as sand, said filter bed separating the channel into an upper part receiving supernatant liquid from the tank 10 through suitable openings or apertures 15 in the inner wall 16 of the channel, and a lower part 17 beneath the filter bed to receive the filtered liquid. From the lower part 17 the liquid may be discharged in any suitable manner. The openings 15 may be of any suitable form but, as illustrated, the lower side of each opening is inclined upwardly from the interior of the tank to the interior of the channel and the top of each opening is substantially horizontal. The entrance of each opening is therefore much larger than its exit. A plate 18 may be placed across the upper part of the entrance of each of said openings to cause the supernatant liquid to flow through the lower part of the entrance and upwardly to the exit, this arrangement tending to prevent the flow of scum into the filter channel. It should be understood that although the filter channel 13 is shown within the limits of the peripheral wall 11, the channel may be mounted just outside of the wall 11 or on top thereof. The tank 10 and channel 13 may be of any suitable material such as concrete.

The liquid to be treated, such as sewage, may be introduced into the central part of the tank through a duct 19 comprising a curved pipe section 20 embedded in concrete forming part of the bottom of the tank and having its discharge end facing upwardly and a pipe section 21 fitting tightly against the upper end of the curved pipe section 20 and contained in a central pedestal or pier 22 of which the lower end is supported on the concrete of the tank bottom. The upper end of the pipe section 21 is connected with the peripheral wall of the pedestal 22 by an annular member 23 and a short distance above the annular member 23 the pedestal is closed by a plate or member 24. Between the annular member 23 and the plate or partition 24 the peripheral wall of the pedestal 22 is provided with discharge openings or outlets 25 through which the liquid passes into the central part of the tank.

Immediately above the outlets 25 the pedestal 22 is provided with an annular downwardly inclined deflector 26 which causes the liquid to be turned downwardly as it is discharged through the outlets 25. Surrounding the pedestal near the outlets 25 is a baffle 27 comprising a cylindrical wall 28 surrounding the pedestal 22 and having an annular top 29 inclined downwardly from the pedestal 22 above the deflector 26 leaving a space between said top and said deflector so that liquid discharged through the outlets 25 and turned downwardly by the deflector 26 will tend to draw downwardly, between the deflector and the top, liquid passing downwardly through openings 30 in said top of the baffle, and thus cause a surface flow of liquid toward the center of the tank. Surrounding the pedestal near the bottom of the cylindrical wall 28 of the baffle 27 is an outwardly flared member or deflector 31 which obstructs the downward passage of the fluid toward the bottom of the baffle and tends to throw the liquid against the cylindrical wall of baffle 27 which is provided with relatively small openings 32 through which the liquid may pass, the solids being held back by the cylindrical wall and tending to fall downwardly through the annular narrow opening at the face of the baffle and settle to the bottom of the tank.

The solids settled from the liquid in the tank 10 settle on the bottom 12 in the form of sludge and this sludge is gradually worked inwardly toward the center of the tank by means of inclined scrapers or rake members 33 depending from a supporting structure 34 which is in turn supported by a bridge 35 rotatably supported at one end on the top of the pedestal 22 and extending from the pedestal to the side of the tank where it may be supported by means including one or more wheels 36 mounted thereon and a rail 37, each wheel 36 resting on the rail 37 which in turn is supported on the top of the peripheral wall 11 of the tank. The sludge when brought to the central part of the tank passes into an annular channel 38 in the bottom of the tank and extending around the base of the pedestal 22, and is withdrawn therefrom through a duct 39 in any suitable manner. Located above the annular channel 38 is an annular plate 40 to regulate the passage of the sludge into the channel 38. To operate the scraping or raking apparatus, a wheel 36, or more than one, supporting the bridge 35 may be power actuated. This result may be obtained by means of a flexible connector such as a sprocket chain 41 mounted on a pulley 42 fixed on the shaft of the wheel 36 and on a pulley or sprocket wheel 43 driven through a speed reducer 44 by a motor 45.

In order to operate the apparatus continuously, provision may be made of means for cleaning the filter bed material, such as sand, while the apparatus is in operation. To this end a sand cleaning device or cleaner 46 of known type is suspended from the bridge 35. In the present instance dirty water containing solids which has been separated from the sand in a cleaning operation in the caisson of the cleaner 46 is withdrawn from the caisson by means of a suction pump 47 operated by a motor 48 carried by the bridge 35.

Up to this point the apparatus described has, with the exception of a few details, been of a known type. Although a number of different filter bed cleaners of this general type have been developed, substantially all of them that have been put into operation have caused trouble in that the cleaning mechanism disturbs the sand directly above the screen which may permit dirty water, containing solids, within the caisson to pass through the screen into the effluent. Passage of solids through the filter may also result from a flow of unfiltered liquid carrying solids completely through a small freshly cleaned area of the filter bed for example, a cleaned area just vacated by the cleaner. As a matter of fact it is a common occurrence for solids to pass through a filter medium when it is first put into use. Applicant has found that such disadvantages may be obviated by dividing the part 17 beneath the filter bed into a plurality of sections or chambers and in shutting off the flow of water through any one of said sections while a portion of the filter bed above that section is being cleaned.

As illustrated in the drawings, the part 17 beneath the filter bed has been divided into two sections or chambers by means of a partition 49 at the discharge side or outlet of the combined settling and filtering apparatus and a partition 50 at a point substantially 180° from the first mentioned partition 49. An extension of the partition 49 serves to divide the outlet into two substantially equal parts or weir chambers 51, from which the liquid flows over a wall 52 into a compartment 53 and then into a duct 54. Obviously the partition 49 causes the liquid from the separated sections or chambers of the part 17 to be discharged in two streams side by side, each of these streams comprising the filtered liquid from a corresponding half of the filter bed. Preferably each portion of the wall 52 at opposite sides of the partition 49 is supplied with a weir or weir plate 55 and immediately above each weir plate 55 is a vertically movable slide or gate 56. Either of the slides 56 when lowered will cause the liquid level back of the same to rise and cause the effective head at the filter bed to fall substantially to zero, thus shutting off flow of liquid through the filter bed in the corresponding half of the tank so as to avoid the downward passage of any substantial amount of solids through such part of the filter bed during the cleaning thereof. In order to facilitate the flow of liquid and settling solids through the chamber 17 to the outlet, the chamber 17 may be relatively shallow near the partition 50 and gradually increase in depth toward the discharge side adjacent the partition 49, and the bottom of the chamber may be inclined downwardly from each side toward its center line to facilitate the flow. Such arrangement of the bottom of part 17 will cause solids settling from the liquid to pass to the middle of the channel and thence to the outlet.

Each gate 56 may be raised and lowered by any suitable means such as a vertically arranged reversible motor 57 carrying on its shaft a gear 58, a gear 59 meshing with gear 58 and having a hub 60 with an internal screw thread, and a screw-threaded rod 61 passing through the screw-threaded hub 60 to be raised or lowered by rotation thereof and having its lower end fixed to the upper part of the gate.

Figure 3:
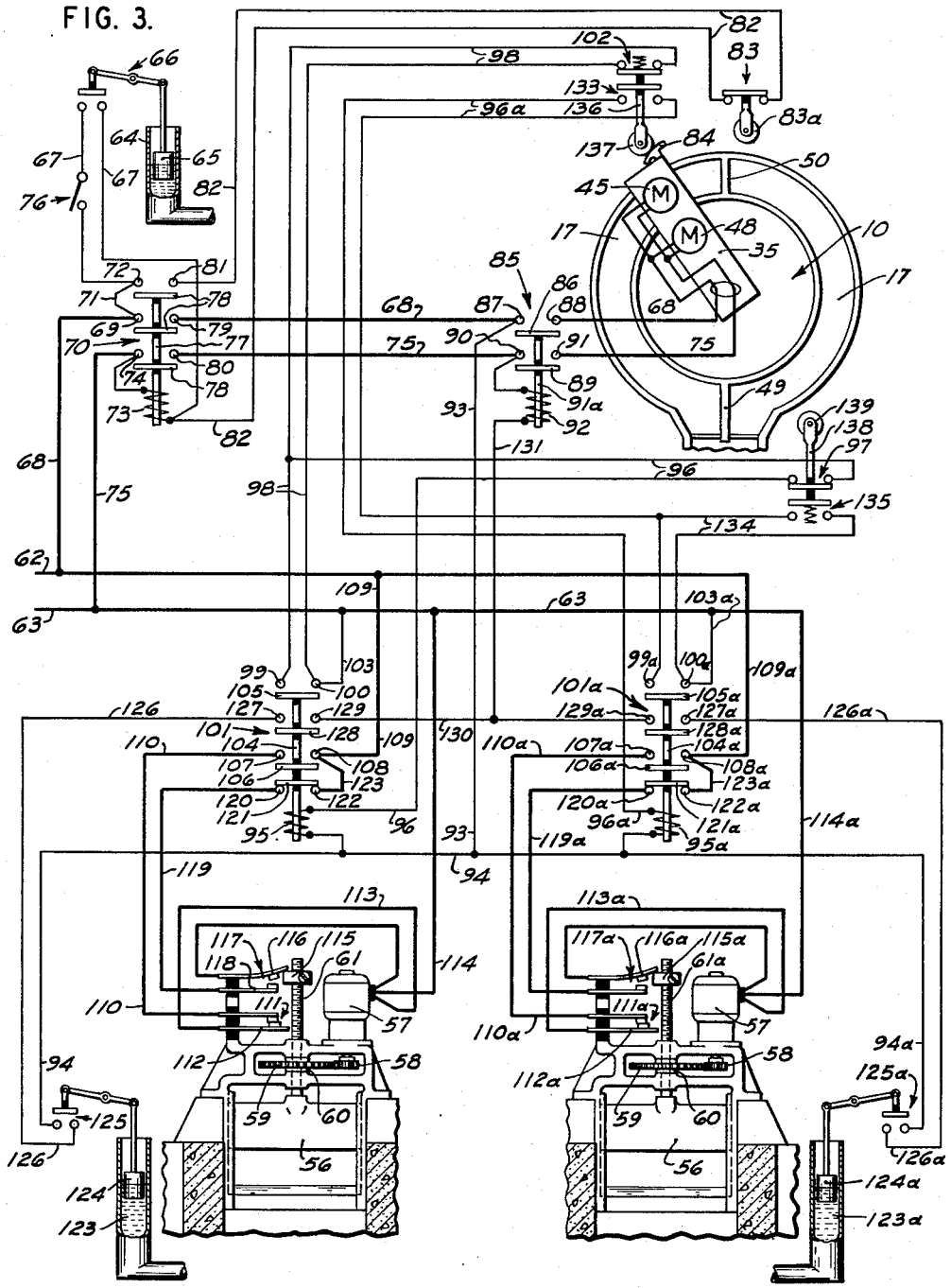
Fig. 3 is a diagrammatic view illustrating electrical means for automatic control of operation.

Operation of the apparatus may be effected by means of an electrical system such as illustrated in Fig. 3. As illustrated there are two main conductors 62 and 63 and the various parts of the apparatus may be operated therefrom under control by means including suitable electro-magnetic devices and float controlled switches. If the liquid level in the settling tank 10 rises to a predetermined level, there is a corresponding rise of liquid level in a vertical tube 64 outside of the tank but suitably connected with the interior thereof. This change of liquid level causes a corresponding upward movement of a float 65 which operates a switch 66 to close a gap in a starting circuit 67 and thus to cause current from the main conductor 62 to pass through a conductor 68 of a cleaner-operating circuit for operating the bridge-actuating motor 45 and the pump-motor 48 to a switch contact 69 of a switch 70 in the operating circuit, and through a connection 71 to a switch contact 72 to which is connected one end of the starting circuit 67. The other end of the starting circuit 67 is connected through a solenoid coil 73 to a switch contact 74 which in turn is connected to the main conductor 63 by a conductor 75 also forming a part of the cleaner-operating circuit. In order to determine whether or not the apparatus is to be operated automatically, provision may be made of a switch 76 in the conductor or shunt circuit 67. If the switch 76 be kept closed the apparatus will be operated automatically. Under some conditions the apparatus would be kept in operation continuously although this would be unnecessary and undesirable. Under such conditions the switch 76 could be used to keep the apparatus out of use when desired and for this purpose the switch could be operated manually or by a timing device.

With the switch 76 closed, and the various parts in their Fig. 3 positions, closing of the switch 66 by rise of the liquid level in the settling tank will complete a circuit through the solenoid coil 73 and shift a switch member or rod 77 so that members 78 carried by the rod will connect contacts 69 and 74 with contacts 79 and 80 thereby closing switch 70 and connecting conductors 68 and 75 to extensions thereof which also form part of the cleaner-actuating circuit. Such movement of the switch member 77 also connects through another member 78, contact 72 to a contact 81 at one end of a conductor 82 connected at its other end to solenoid coil 73 at the same end as conductor 67. The conductor 82 constitutes a relay or holding circuit which acts to hold the switch 70 closed until a switch 83 in the holding circuit is opened by means of a cam or cam wiper 84 on the bridge 35 after substantially one revolution of the bridge from its Fig. 3 position.

Before the bridge 35 starts to move from its Fig. 3 position over the left half of the tank as viewed in Fig. 3, the gate 56 at the left hand, Fig. 3, should be closed so as to prevent discharge of liquid beneath the half of the filter bed being cleaned. To this end there is provided in the bridge operating circuit a switch 85 which tends to remain open and comprises a switch member 86 to connect terminals 87 and 88 at opposite sides of a break in the conductor 68 and a switch member 89 to connect contacts 90 and 91 at opposite sides of the break in the conductor 75. The switch members 86 and 89 may be mounted on a rod 91ª of which a part forms the core of a solenoid having a coil 92 whereby the switch 85 may be closed when the coil is energized, de-energizing of the coil permitting the switch to open.

The contact 87 is connected by means of conductor 93 with a conductor 94 which is common to both gate operating systems. From the conductor 94 the current may pass through a solenoid coil 95 to a conductor 96 having therein a switch 97 which tends to remain closed and is closed at this time. From the conductor 96 the current may pass to a conductor 98 connected at its ends with switch contacts 99 and 100 of a multiple switch 101 controlled by the solenoid including the coil 95. In the conductor 98 is a switch 102 which is maintained closed at this time by the cam 84 on the bridge 35. Current passing through the conductor 96 to the conductor 98 passes to contact 100 and from there to the main conductor 63 through a connection 103. As a result of the passage of the current through these conductors, the solenoid coil 95 is energized and causes a rod 104 of which a part is the core of the solenoid to move longitudinally and bring a switch member 105 into position to bridge or connect the contacts 99 and 100 and close a holding or relay circuit, so that the solenoid coil 95 will remain energized when the switch 102 is opened.

The shifting of the rod or core 104 will also shift a switch member 106 to bridge or connect contacts 107 and 108 so that current from the conductor 62 will pass through a conductor 109, the contacts 108 and 107 connected by the switch member 106, a conductor 110, a closed switch 111 comprising a spring contact 112, and a conductor 113 to the left hand motor 57, and then through a conductor 114 to the main conductor 63. This connection will start the motor 57 so as to lower the left hand gate 56. As the screw threaded rod 61 controlling the gate moves downwardly, a collar 115 thereon moves downwardly and first releases a spring contact 116 forming part of a switch 117 and permits it to come into contact with a contact 118 connected through a conductor 119 with a contact 120 of the switch 101. At the time of the closing of the switch 66, the contact 120 was connected by means of a switch member 121 with a contact 122 connected by branch 123 to contact 108 and through conductor 109 to the main conductor 62, but when the rod 104 was shifted the switch member 121 was shifted to disconnect the contacts 120 and 122.

Engagement of the contacts 116 and 118 will therefore have no effect on the actuation of the motor 57. When, however, the gate has been brought down to substantially its lowermost position, the collar 115 on the rod 61 will engage the end of the spring contact 112 of the switch 111 and separate it from the other contact of the same switch. The circuit through the motor 57 will then be broken and the motor will stop with the gate 56 in its lowermost position.

The liquid level adjacent the closed left hand gate 56 will then rise until it reaches the level of the liquid in the main tank and the effluent head thus produced will cause liquid to rise in a tube 123 connected at its lower part to the corresponding effluent channel. This rise of liquid level will cause upward movement of a float 124 and consequent closing of a switch 125 in a conductor 126 connecting conductor 94 to a contact 127.

The shifting of rod 104 due to energizing coil 95 causes a switch member 128 to connect contact 127 with a contact 129 and with conductor 130 and 131 completes a circuit through coil 92 and closes switch 85 in the bridge-operating or cleaner-operating circuit.

As soon as the bridge 35 has traveled a very short distance from its Fig. 3 position, the wiper 84 will release the switch 102 and cause the same to open and at the same time cause to close a switch 133 in a conductor 96a having therein a switch 135 connected to the switch 97 so that when switch 97 is opened switch 135 will be closed. Control of the switches 102 and 133 by means of the cam wiper 84 may be effected by mounting the switches on a rod 136 having at one end a roller 137 to be engaged by the cam wiper 84. After the bridge has turned through approximately 180° from its Fig. 3 position, the cam wiper 84 may act through a suitable connection to open the switch 97 and close the switch 135. This result may be effected by mounting the switches 97 and 135 on a rod 138 provided with a roller 139 to be engaged by the cam wiper 84.

The opening of the switch 97 will deenergize the solenoid coil 95 and permit the rod 104 of the switch 101 to return to its Fig. 3 position thus breaking, between contacts 128 and 129, the circuit of the solenoid coil 92 and causing the switch 85 to open, thereby stopping the bridge 35 and leaving the cleaner 46 just past partition 49. The switch 70 in the cleaner-operating circuit will, however, remain closed at this time because the solenoid coil 73 is kept energized through the circuit 82.

The restoration of the switch 101 to its Fig. 3 condition will open, between the contacts 107 and 108, the motor circuit, already open at switch 111, through which the motor 57 is operated to lower the gate, and will close between contacts 120 and 122 the motor circuit containing the switch 117, closed at this time, thereby operating the motor 57 to lift the gate 56 until the member or collar 115 lifts the spring contact 116 and opens the circuit, thereby stopping the motor with the gate in open position. The liquid in the corresponding effluent chamber will then fall and if the fall be sufficient the switch 125 will be opened.

At the same time that the switch 97 is opened, the switch 135 is closed, thus initiating the lowering of the right hand gate 56. Current will then pass through conductors 93 and 94 to a solenoid coil 95a, effect movement of the rod 104a of switch 101a and cause switch member 105a to connect the contacts 99a and 100a, thereby completing for the solenoid coil 95a a circuit which is independent of switch 135. The coil 95a will therefore remain energized until switch 133 is opened by cam wiper 84 when the bridge 35 reaches its Fig. 3 position.

Such movement of the rod 104a will also move switch member 106a to connect contacts 107a and 108a, a switch member 121a to disconnect contacts 120a and 122a, and a switch member 128a to connect contacts 127a and 129a.

The connection of the contacts 107a and 108a by the switch member 106a will complete a connection from the main conductor 62 to the main conductor 63 through conductor 109a, switch member 106a, conductor 110a, switch 111a, conductor 113a, right hand motor 57 and conductor 114a. This connection will cause the right hand motor 57 to close the correspondent gate 56 and will cause member 115a to release spring contact 116a, thus closing switch 117a. As this gate approaches its closed position member 115a will engage spring contact 112a and open switch 111a, thus stopping the motor. Liquid will then pass downwardly through the right hand section of the filter until the effluent head becomes substantially equal to the head in the settling tank. This change of head will result in lifting float 124a in tube 123a sufficiently to close switch 125a.

The closing of the switch 125a will serve to complete a circuit through conductor 93, conductor 94, switch 125a, conductor 126a, switch member 128a, conductor 130, conductor 131 and solenoid coil 92, thus closing switch 85 and causing the cleaner 46 to travel over and clean the second half of the filter bed.

As the bridge 35 carrying the cleaner 46 approaches its Fig. 3 position, cam wiper 84 will engage roller 83a and open switch 83, thus deenergizing solenoid coil 78 and causing switch 70 to open, unless float-controlled switch 66 is still closed. Ordinarily the switch 66 will be open and operation of the cleaner will cease until switch 66 is again closed.

The spacing of rollers 82a and 137 is exaggerated in Fig. 3 for purposes of clarity of showing, but actually they are rather close together as shown in Fig. 1, and after opening switch 83, the bridge 35 will coast sufficiently to cause cam wiper 84 to open switch 133 and close switch 101 preparatory to another trip of the cleaner around the filter channel.

Although the cleaner has been thrown out of operation, the right hand gate 56 is closed and must be opened. This opening has been initiated by the opening of switch 133 which deenergizes solenoid coil 95a and causes switch member 121a to engage contacts 121a and 122, thus completing a circuit from main conductor 62 to main conductor 63 through conductors 109a, conductor 123a, switch member 121a, conductor 119a, switch 117a which is closed at this time, right hand motor 57, and conductor 114a, thus causing this motor to operate to open the corresponding gate 56. As the gate rises, the member 115a will first release spring contact 112a and permit closing of switch 111a in a circuit which is at this time open between the contacts 107a and 108a, and later engage spring contact 116a to open switch 117a and stop the motor.

The liquid level at the weirs is lower than the level in the tank when the entire filter is in operation, in that there must be a difference of head in order to cause a downward flow of liquid through the filter bed. Closing of the gate at one of the weirs will cause the effluent liquid level at the gate to rise not only to the normal level in the tank but also to the abnormal level which causes closing of the switch 66, and the arrangement is such that the switches 125 and 125a will not open until the opening of the corresponding gates is started.

The general operation of the apparatus under control by the electrical system illustrated diagrammatically in Fig. 3 is as follows: The rise of the liquid in the main tank to a predetermined level causes the flow of liquid over the first or left hand weir (Fig. 3) to be stopped. The stopping of the effluent flow causes the effective head at the filter bed to fall to substantially zero so that no liquid will pass downwardly through the filter bed. Then the cleaner is started in motion and cleans the first or left hand half of the filter bed. As the cleaner passes from the first half of the filter bed to the second or right hand part, the cleaner is brought to rest, the liquid is permitted to flow past the left hand weir and the flow over the right hand weir is stopped. The downward flow through the right hand half of the filter bed will be stopped and the cleaner started over the right hand half of the filter bed. As the cleaner completes the cleaning of the right hand half of the filter bed, the effluent will be permitted to flow over the right hand weir, thus restoring the right hand half of the filter bed to use. The power for actuating the cleaner will also be shut off but at such a point that the cleaner will coast until it reaches the beginning of the left hand half of the filter bed. Ordinarily the cleaning of the complete filter bed will cause the liquid level in the main tank to sink sufficiently to permit the cleaner to remain at rest. If the liquid level is still high, the cleaner may take another trip around the filter bed unless switch 76 be opened.

Inasmuch as the cleaner moves very slowly along the filter bed, the cleaner may be started without waiting for the stopping of effluent flow. Then the cleaner would make a complete circuit without stoppage as the cleaning of the left hand half of the filter bed closes and the cleaning of the right hand half begins. Such a result may be obtained by holding the switch 85 closed regardless of the action of the solenoid coil 92. Obviously the opening and closing of switches 125 and 125a would have no effect if switch 85 be held closed. The float control closing switch 66 would then start the cleaner and start stoppage of effluent flow at the first weir. The cleaner would make one complete circuit, and, as it passed from the first half of the filter bed to the second, the flow of effluent at the first weir would be started and the flow at the second weir would be stopped. At the competition of one trip over the filter bed the flow at the second weir would be started and the cleaner stopped over the starting end of the first half of the filter bed. It will be evident that the cleaning operation may also be started by manual closing of the switch 66.

It will be evident that the invention involves the cleaning of a filter in one or more sections, in which the cleaning of a section involves the reduction of the effective head through that section to substantially zero by stopping the effluent flow from the bottom of the filter bed, the cleaning of the section by a cleaner traveling over the same, and the restoration of effective head at completion of cleaning by permitting suitable discharge of the effluent. In the event that a cleaned filter section again becomes clogged the cleaning operation just described will be repeated.

In the apparatus disclosed the effluent channels are open at their tops and the liquid must rise to a predetermined height before the downward flow through the filter bed is stopped. If, however, the flow be stopped by a gate closing an effluent outlet of a chamber having a closed top, the downward flow through the filter would be stopped immediately.

As already stated the downward flow through the filter bed is stopped, for the area to be cleaned by the traveling cleaner, by back pressure at the lower side of the filter bed. However, due to the fact that dirty water is being sucked from the caisson or chamber of the cleaner, filtered liquid may be drawn up through the supporting screen and clean the same.

It should be understood that various features may be changed and that certain features may be used without others, without departing from the true scope and spirit of the invention.

What I claim is:

1. In filtration apparatus, a filtered effluent chamber having an outlet, a filter bed over said chamber, a filter bed cleaner mounted to move over the filter bed above said chamber, means for operating said cleaner over the filter bed above said effluent chamber, means connected with the effluent chamber outlet for regulating the effective head passing liquid downwardly through the filter bed, means, rendered effective by the rise of the liquid over the filter bed to a predetermined level, to operate such regulating means to increase the back pressure and reduce the effective head to substantially zero and for starting the cleaner-operating means, and means for restoring the effective head at the filter bed over said chamber when the cleaning is completed.

2. The combination with a settling chamber and a surrounding filter channel having a filter bed at the bottom thereof, of a plurality of segregated effluent chambers beneath corresponding parts of the filter bed, weir chambers individual to said effluent chambers and receiving effluent therefrom, discharge weirs one for each of said weir chambers for controlling the effective head through the corresponding parts of the filter bed, a filter bed cleaner, means for operating the cleaner and moving it along said channel, and means for shutting off the flow of effluent over any of said weirs so as to enable reduction of the effective head to zero at any part of the filter bed being cleaned.

3. The combination with a settling chamber and a surrounding filter channel having a filter bed at the bottom thereof, of a plurality of segregated effluent chambers beneath corresponding parts of the filter bed, weir chambers individual to said effluent chambers and receiving effluent therefrom, discharge weirs one for each of said weir chambers for controlling the effective head through the corresponding parts of the filter bed, a filter bed cleaner, means for operating the cleaner and moving it along said channel, and means controlled by the position of said cleaner for shutting off the flow of effluent over any one of said weirs as the cleaner begins to clean the filter bed above the corresponding effluent chamber so as to reduce the effective head to zero at the part of the filter bed being cleaned and for starting the flow of filtered liquid over such weir as the cleaner completes the cleaning of such part.

4. The combination with a settling chamber and a surrounding filter channel having a filter bed at the bottom thereof, of a plurality of segregated effluent chambers beneath corresponding parts of the filter bed, weir chambers individual to said effluent chambers and receiving effluent therefrom, discharge weirs one for each of said weir chambers for controlling the effective head through the corresponding parts of the filter bed, a filter bed cleaner, means for operating the cleaner and moving it along said channel rendered effective by rise of liquid level in said settling chamber above a predetermined level, means for shutting off the flow of effluent over any one of said weirs as the cleaner begins to act on the corresponding part of the filter bed, so as to reduce the effective head to zero at the part of the filter bed being cleaned and for starting liquid flow over such weir as the cleaner passes beyond such part of the filter bed, and means for stopping the cleaner after one round trip unless the liquid level in the settling chamber is still too high.

5. The combination with a settling chamber and a surrounding filter channel having a filter bed in the lower part thereof, of a plurality of segregated effluent chambers beneath corresponding parts of the filter bed, weir chambers individual to said effluent chambers and receiving effluent therefrom, discharge weirs one for each of said weir chambers for controlling the effective head through the corresponding parts of the filter bed, a filter bed cleaner, filter-bed-cleaner-operating means, means, rendered effective by rise of liquid level in the settling chamber above a predetermined level, for shutting off the flow of effluent over the weir associated with the effluent chamber over which the cleaner lies and raising the liquid level in the corresponding weir chamber to substantially the height of the liquid level in the tank, means rendered effective by such rise of liquid level in each weir chamber to render the filter-bed-cleaner-operating means effective, and means for restoring the flow of effluent over such weir when the cleaning of the corresponding part of the filter is completed.

6. The combination with a settling chamber and a surrounding filter channel having a filter bed in the lower part thereof, of a plurality of segregated effluent chambers beneath corresponding parts of the filter bed, weir chambers individual to said effluent chambers and receiving effluent therefrom, discharge weirs one for each of said weir chambers for controlling the effective head through the corresponding parts of the filter bed, a filter bed cleaner, filter-bed-cleaner-operating means, means, rendered effective by rise of liquid level in said settling chamber above a predetermined level, for placing said filter-bed-cleaner-operating means in condition for operation, means rendered effective by rise of liquid level in the settling chamber above a predetermined level for shutting off the flow of effluent over one of said weirs associated with the effluent chamber over which the cleaner lies and raising the liquid level in the corresponding weir chamber to substantially the height of the liquid level in the tank, means rendered effective by such rise of liquid level in each weir chamber to render the filter-bed-cleaner-operating means effective, and means for restoring the flow of effluent over such weir when the cleaning of the corresponding part of the filter bed is completed.

7. The combination with a settling chamber and a surrounding filter channel having a filter bed in the lower part thereof, of two effluent chambers beneath said filter bed segregated from each other by partitions at diametrically opposite positions, outlets for said effluent chambers at opposite sides of one of said partitions, a filter bed cleaner adapted to travel over said filter bed and means controlled by the position of the cleaner for regulating the flow through said outlets so that the effective head at the half of the filter bed over each effluent chamber is maintained at substantially zero during the passage of the cleaner thereover and at a substantially normal amount during the passage of the cleaner over the other half of the filter bed.

8. The combination with a settling chamber and a surrounding filter channel having a filter bed in the lower part thereof, of two effluent chambers beneath said filter bed segregated from each other by partitions at diametrically opposite positions, outlets for said effluent chambers at opposite sides of one of said partitions, a filter bed cleaner adapted to travel over said filter bed and means controlled by the position of the cleaner for regulating the flow through said outlets so that the effective head at the half of the filter bed over each effluent chamber is maintained at substantially zero during the passage of the cleaner thereover and at a substantially normal head during the passage of the cleaner over the other half of the filter bed, said effluent chambers increasing in depth from the partition opposite the outlets to the outlets.

9. The combination with a settling chamber and a surrounding filter channel having a filter bed in the lower part thereof, of two effluent chambers beneath said filter bed segregated from each other by partitions at diametrically opposite positions, outlets for said effluent chambers at opposite sides of one of said partitions, a filter bed cleaner adapted to travel over said filter bed and means controlled by the position of the cleaner for regulating the flow through said outlets so that the effective head at the half of the filter bed over each effluent chamber is maintained at substantially zero during the passage of the cleaner thereover and at a substantially normal head during the passage of the cleaner over the other half of the filter bed, said effluent chambers increasing in depth from the partition opposite the outlets to the partition between the outlets, and having their bottoms inclined from the sides toward the middle thereof to assure the removal of solids settling thereon.

10. The combination with a settling chamber, a surrounding filter channel having a filter bed in the lower part thereof, and a cleaner arranged for movement along said filter bed, of two effluent chambers beneath said filter bed segregated from each other by substantially diametrically opposite partitions, outlets on opposite sides of one of said partitions, weir chambers receiving filter effluent from said effluent chambers, a discharge weir for each weir chamber, means including a movable member for shutting off flow over each of said weirs and by rise of liquid in the corresponding weir chamber reducing the effective head in the corresponding half of the filter bed and preventing downward flow therethrough, means for moving the cleaner along the filter bed, a control device traveling with said cleaner, means for operating each movable member to shut off or start flow over one of said weirs, float-controlled means for starting the shutting off of flow over the first weir and causing rise of liquid in the first weir chamber, means thrown into operation by the rise of liquid in this weir chamber to start said cleaner, means operated by said control device for stopping the cleaner after moving over the first half of the filter bed, moving the first movable member to open position to restore the corresponding half of the filter bed to service and moving the second member to closed position, means for starting the cleaner around the second half of the filter bed, means for throwing the cleaner out of operation as it completes the cleaning of the second half of the filter bed, and means for completing the opening of the second movable member after the rest of the apparatus has been thrown out of operation.

11. The combination with a settling chamber and a surrounding filter channel having a filter bed in the lower part thereof, of two effluent chambers beneath corresponding parts of said filter bed, weir chambers individual to said effluent chambers and receiving effluent therefrom, discharge weirs one for each of said weir chambers for controlling the effective head through the corresponding parts of the filter bed, a filter bed cleaner, filter-bed-cleaner-operating means rendered effective by rise of liquid-level in said settling chamber above a predetermined level, a control device traveling with said cleaner, means rendered effective by said control device for stopping downward flow through the part of the filter bed about to be cleaned by stopping the flow over the corresponding weir, and means rendered effective by said control device for restoring the flow over a weir as soon as the cleaning of the corresponding part of the filter bed is completed.

12. The combination with a settling chamber and a surrounding filter channel having a filter bed in the lower part thereof, of two effluent chambers beneath corresponding parts of said filter bed, weir chambers individual to said effluent chambers and receiving effluent therefrom, discharge weirs one for each of said weir chambers for controlling the effective head through the corresponding parts of the filter bed, a filter bed cleaner, means rendered effective by rise of liquid level in the settling chamber for stopping downward flow through a part of the filter bed about to be cleaned by stopping the flow over the corresponding weir and thereby raising the liquid level in such weir chamber, filter-bed-cleaner operating means rendered effective by the rise of liquid level in each of said weir chambers, means for restoring flow over a weir after the cleaning of the corresponding part of the filter bed has been completed, and a control device traveling with said cleaner for assuring shutting off of flow over a weir when cleaning of a corresponding part of the filter is started and restoration of flow over such weir when the cleaning is completed.

13. In apparatus of the class described, the combination with an endless filter channel having a filter bed therein, a filter-bed-cleaner traveling along said filter bed, of two effluent chambers arranged end to end beneath said filter bed, two weir chambers each receiving effluent from an effluent chamber, a weir for each weir chamber, a switch-operating device traveling along said filter in synchronism with said cleaner, a movable member for controlling flow over each of said weirs, a reversible motor for each of said movable members connected thereto so as to move the same to shut-off position when operated in one direction and to open position when operated in the other direction, a weir-shut-off circuit for each motor, an opening circuit for each motor, a switch in each of said circuits yieldably closed but opened by the movable member as it approaches its limiting position in the corresponding direction, a reversing switch urged to close the opening circuit but movable to close the weir-shut-off circuit, means including an operating circuit to shift each reversing switch to close the weir-shut-off circuit, means including a holding circuit for retaining each reversing switch in shifted position, and means actuated by said switch-operating device moving above the initial part of one of said effluent chambers to close the corresponding operating circuit and then open it, and at the same time to release the holding circuit for the other reversing switch and effect shifting of the corresponding movable member to open position.

14. In apparatus of the class described, the combination with an endless filter channel having a filter bed therein, a filter-bed-cleaner traveling along said filter bed, of two effluent chambers arranged end to end beneath said filter bed, two weir chambers each receiving effluent form an effluent chamber, a weir for each weir chamber, a switch-operating device traveling along said filter in synchronism with said cleaner, a movable member for controlling flow over each of said weirs, a reversible motor for each of said movable members connected thereto so as to move the same to shut-off position when operated in one direction and to open position when operated in the other direction, a weir-shut-off circuit for each motor, an opening circuit for each motor, a switch in each of said circuits yieldably closed but opened by the movable member as it approaches its limiting position in the corresponding direction, a reversing switch urged to close the opening circuit but movable to close the weir-shut-off circuit, means including an operating circuit to shift each reversing switch to close the weir-shut-off circuit, means including a holding circuit for retaining each reversing switch in shifted position, means actuated by said switch-operating device moving above the initial part of one of said effluent chambers to close the corresponding operating circuit and then open it, and at the same time to release the holding circuit for the other reversing switch and effect shifting of the corresponding movable member to open position, means including an operating circuit for operating said cleaner, and a switch in such cleaner-operating circuit closed by movement of either reversing switch to close the corresponding weir-shut-off circuit.

15. In apparatus of the class described, the combination with an endless filter channel having a filter bed therein, a filter-bed-cleaner traveling along said filter bed, of two effluent chambers arranged end to end beneath said filter bed, two weir chambers each receiving effluent from an effluent chamber, a weir for each weir chamber, a switch-operating device traveling along said filter in synchronism with said cleaner, a movable member for controlling flow over each of said weirs, a reversible motor for each of said movable members connected thereto so as to move the same to shut-off position when operated in one direction and to open position when operated in the other direction, a weir-shut-off circuit for each motor, a flow restoring circuit for each motor, a switch in each of said circuits yieldably closed but opened by the movable member as it approaches its limiting position in the corresponding direction, a reversing switch urged to close the opening circuit but movable to close the weir-shut-off circuit, means including an operating circuit to shift each reversing switch to close the weir shut-off circuit, means including a holding circuit for retaining each reversing switch in shifted position, means actuated by said switch-operating device moving above the initial part of one of said effluent chambers to close the corresponding operating circuit and then open it, and at the same time to release the holding circuit for the other reversing switch and effect shifting of the corresponding movable member to open position, means including an operating circuit for operating said cleaner, a switch in such cleaner-operating circuit closed by movement of either reversing switch to close the corresponding weir-shut-off circuit, a supply switch through which power is supplied for all of said circuits but the flow restoring circuits, means for holding said supply switch closed and means including said switch operating device for rendering said holding means for the supply switch inoperative.

16. In apparatus of the class described, the combination with an endless filter channel having a filter bed therein, a filter-bed cleaner to travel along said bed, of two effluent chambers arranged end to end beneath said filter bed, two weir chambers each receiving effluent from an effluent chamber, a weir for each weir chamber, a movable member controlling the flow over each of said weirs, an electrical system for operating said cleaner and said movable member, a main control switch through which current is supplied from main power lines for operation of the cleaner and said movable members, means for closing said main control switch when the depth of the liquid over the filter bed is raised to a predetermined amount, means for holding the main control switch closed during one trip of the cleaner around the channel, means rendered effective by closing of the main control switch for shifting the movable member controlling the flow from the effluent chamber under the cleaner to shut off the flow over the corresponding weir and by rise of fluid in the corresponding weir chamber stop the flow of liquid through the filter bed over this chamber, means for holding such movable member in effective position until the cleaner moves to the next effluent chamber, a cleaner-controlling switch between the main control switch and the cleaner, means for closing the cleaner-controlling switch when liquid rises to a predetermined level in the weir chamber, means effective upon passage of the cleaner to the next effluent chamber to restore the first movable member to open position under power from the main power lines independent of the main control switch, and connections whereby the cleaning operation for the second half of the filter bed is substantially the same as for the first half.

17. In apparatus of the class described, the combination with an endless filter channel having a filter bed therein, a filter-bed cleaner to travel along said bed, of two effluent chambers arranged end to end beneath said filter bed, two weir chambers each receiving effluent from an effluent chamber, a weir for each weir chamber, a movable member controlling the flow over each of said weirs, an electrical system for operating said cleaner and said movable member, a main control switch through which current is supplied from main power lines for operation of the cleaner and said movable members, means for closing said main control switch, means for holding the main control switch closed during one trip of the cleaner around the channel, means rendered effective by closing of the main control switch for shifting the movable member controlling the flow from the effluent chamber under the cleaner to shut off the flow over the corresponding weir and by rise of fluid in the corresponding weir chamber stop the flow of liquid through the filter bed over this chamber, means for holding such movable member in effective position until the cleaner moves to the next effluent chamber, and means effective upon passage of the cleaner to the next effluent chamber to restore the first movable member to open position under power from the main power lines independent of the main control switch, the cleaning operation for the second half of the filter bed being substantially the same as for the first half.

CHARLES LOSE, Jr.